United States Patent
Marier et al.

[11] Patent Number: 5,994,245
[45] Date of Patent: Nov. 30, 1999

[54] LAMINATED PRODUCT FOR USE IN FOOTWEAR MANUFACTURING

[75] Inventors: André Marier, Ste-Marie; Gérard Scheubel, Ste-Foy, both of Canada; Barbara Redfern, Salem, N.H.

[73] Assignee: Texel Inc., Beauce-Nord, Canada

[21] Appl. No.: 09/077,204
[22] PCT Filed: Nov. 1, 1996
[86] PCT No.: PCT/CA96/00727
§ 371 Date: May 20, 1998
§ 102(e) Date: May 20, 1998
[87] PCT Pub. No.: WO97/19608
PCT Pub. Date: Jun. 5, 1997

Related U.S. Application Data
[60] Provisional application No. 60/007,525, Nov. 24, 1995.
[51] Int. Cl.⁶ ............... D04H 5/14; D04H 5/18
[52] U.S. Cl. ........... 442/373; 442/315; 442/370; 442/374; 36/26; 36/44; 428/85; 428/86; 428/95
[58] Field of Search ................ 442/315, 370, 442/373, 374; 428/85, 86, 95; 36/26, 44

[56] References Cited

U.S. PATENT DOCUMENTS

| | | | |
|---|---|---|---|
| 3,591,882 | 7/1971 | Pearsall | 12/146 |
| 3,766,669 | 10/1973 | Pearsall | 36/43 |
| 3,835,558 | 9/1974 | Revill | 36/44 |
| 3,906,570 | 9/1975 | Revill | 12/146 |
| 4,062,131 | 12/1977 | Hsiung | 36/44 |
| 4,461,099 | 7/1984 | Bailly | 36/44 |
| 4,515,844 | 5/1985 | Coughlin | 428/82 |
| 4,524,529 | 6/1985 | Schaefer | 36/98 |
| 4,602,442 | 7/1986 | Revill et al. | 36/44 |
| 4,642,912 | 2/1987 | Wildman et al. | 36/44 |
| 4,703,533 | 11/1987 | Barma | 12/142 |
| 4,858,337 | 8/1989 | Barma | 36/4 |
| 4,999,237 | 3/1991 | Mellors et al. | 428/280 |
| 5,197,208 | 3/1993 | Lapidus | 36/43 |
| 5,433,987 | 7/1995 | Peterson | 428/137 |
| 5,753,357 | 5/1998 | Filipitsch et al. | 428/307.7 |

FOREIGN PATENT DOCUMENTS

| | | |
|---|---|---|
| 0 300 225 | 1/1989 | European Pat. Off. . |
| 0 602 617 | 6/1994 | European Pat. Off. . |
| 41 06 295 | 9/1992 | Germany . |

*Primary Examiner*—Marion McCamish
*Assistant Examiner*—Arti R. Singh
*Attorney, Agent, or Firm*—Daryby & Darby

[57] ABSTRACT

A laminated insole (2) for a footwear has an upper layer (4) of a resilient foam material having an outline (6) shaped for incorporation in the footwear, and a bottom layer of a fibrous mat (10) and having a shape conforming with the outline (6) of the upper layer (4). The fibrous mat (10) includes a multiplicity of fibers (12), a number of which penetrate the foam material of the upper layer (4) for bonding the bottom layer (10) to the upper layer (4), and a stiffening portion (14) for providing stiffness to the insole (2). Preferably, each of the fibers (12) of those penetrating the foam material (4) emerges from the outer surface (16) thereof and thereby provides a pilosity (17) thereon. The laminated product (2) is suitable for use as an insole as well as a slip-in insole in any footwear. It takes advantage of the resilient properties of the foam, the stiffness and thermoformability of the fibrous mat and the comfort provided by the pilosity covering the upper layer of foam.

28 Claims, 3 Drawing Sheets

LAMINATED PRODUCT FOR USE IN FOOTWEAR MANUFACTURING

This application claims the benefit of Provisional Application No. 60/007,525, Nov. 24, 1995.

FIELD OF THE INVENTION

The present invention relates to a laminated product for use in footwear manufacturing and to a method of manufacturing an insole for a footwear.

BACKGROUND OF THE INVENTION

Different kinds of laminated products using a needling process for bonding two layers of different material are already known in footwear manufacturing. However, a drawback with those products is that they generally do not provide a good rigidity to the finished product and therefore their use is limited to articles which do not require a good rigidity. As a result, they are not very suitable as an insole for footwear.

SUMMARY OF THE INVENTION

It is an object of the present invention to provide a laminated product for use in footwear manufacturing which overcomes this drawback. More particularly, an object of the present invention is to propose a laminated product suitable for use in footwear manufacturing comprising:

An upper layer made of a resilient foam material devised to be in contact with the foot; and a bottom layer made of a fibrous mat and supporting the upper layer, the fibrous mat including:

a multiplicity of fibers, a fraction of which penetrates the foam material of the upper layer for bounding the bottom layer to the upper layer; and a stiffened portion on, and preferably extending inwardly into the product from, the outer face of the fibrous mat to impart rigidity to the product.

Another object of the present invention is to propose a laminated insole for a footwear comprising:

an upper layer made of a resilient foam material and having an outline shaped for incorporation in the footwear; and a bottom layer made of a fibrous mat and having a shape conforming with the outline of the upper layer, the fibrous mat comprising:

a multiplicity of fibers, a fraction of which penetrates the foam material of the upper layer for bonding the bottom layer to the upper layer; and a stiff portion for providing stiffness to the insole.

Preferably, the upper layer has an outer surface opposed to the bottom layer, and each of the fibers of the fraction penetrating the foam material emerges from said outer surface and thereby provides a pilosity thereon.

Preferably also, the stiff portion of the bottom layer is obtained by impregnating an outer surface of the fibrous mat with a member selected from the group consisting of a latex, a solution of thermoplastic resin and a solution of thermosetting resin.

Alternatively, the fibrous mat may comprise a plurality of constructive fibers having a given melting point and a plurality of binding fibers having a melting point smaller than the melting point of the constructive fibers; and then the stiff portion of the fibrous mat may be obtained by subjecting an outer surface of the fibrous mat to a temperature greater than the melting point of the binding fibers and smaller than the melting point of the constructive fibers.

A further object is to propose a method of manufacturing a laminated product suitable for use in footwear manufacturing, the method comprising the steps of:

a) needling a layer made of a fibrous mat comprising a multiplicity of fibers to a layer made of a resilient foam material such that a fraction of said fibers penetrates the foam material; and b) stiffening a portion of the fibrous mat for providing stiffness to the insole.

Advantageously, a laminated product according to the present invention is suitable for use as an insole as well as a slip-in insole in any footwear. As can be appreciated, it takes advantage of the resilient properties of the foam and the stiffness and thermoformability of the fibrous mat and in a preferred version it also takes advantage of the comfort provided by the pilosity covering the upper layer of foam.

A non restrictive description of preferred embodiments will now be given with reference to the appended drawings.

DESCRIPTION OF PREFERRED EMBODIMENTS

Figure 1:
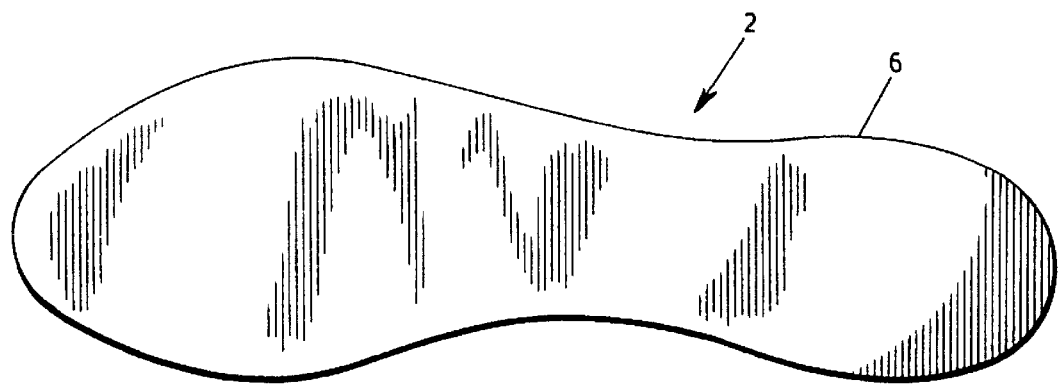
FIG. 1 is a top view of an insole according to a preferred embodiment of the present invention.
Figure 2:
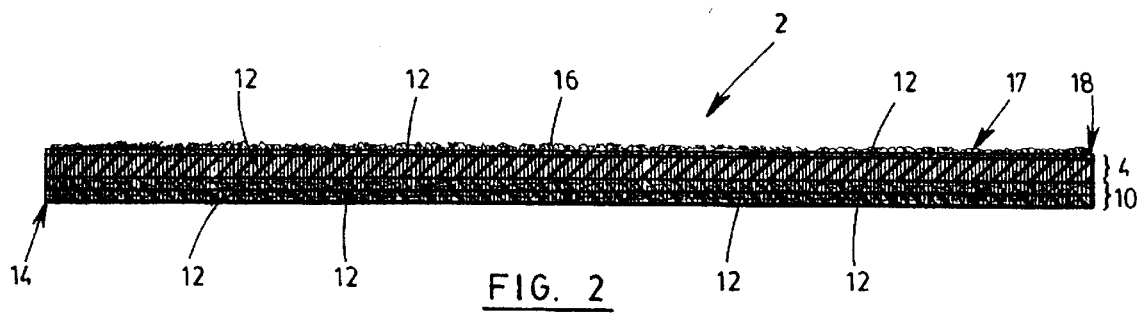
FIG. 2 is a side elevational cross-sectional view of the insole shown in FIG. 1.

Referring to FIGS. 1, 2 and also 6, the invention is generally characterized by a laminated product (2) suitable for use as an insole for a footwear. It can also be used as a slip-in insole. This product may be used flat and be cut for matching the shape of a foot. It comprises an upper layer made of a resilient foam material (4) and, if it is used as an insole as shown in FIG. 1, it also has an outline (6) shaped for incorporation in a footwear. The product (2) further comprises a bottom layer made of a fibrous mat (10) and having a shape conforming with the outline of the upper layer (4). The fibrous mat (10) which comprises a multiplicity of fibers (12) is needled to the upper layer (4) so that a fraction of those fibers (12) penetrates the foam material of the upper layer (4) for bonding the bottom layer (10) to the upper layer (4). The fibrous mat (10) further comprises a stiff portion (14) for providing stiffness to the product (2). As illustrated, the fibrous mat (10) preferably includes a non-woven mat of fibers.

Each of the fibers (12) of the fraction penetrating the foam material (4) preferably emerges from the outer surface (16) of the upper layer (4) and thereby provides a pilosity (17) thereon which gives a comfortable finish to the product (2).

Alternatively, the laminated insole (2) may further comprise a reinforcement laminate (9) embedded in the fibrous mat (10). In other words, the fibrous mat (10) may contain in its structure a reinforcement fabric or laminate (9), bonded together with the fibers during construction of the mat (10).

The reinforcement fabric or laminate (9) may be a polypropylene scrim fabric with very small openings, or said scrim may be coated on one or both sides with a 1 to 3 mils polypropylene coating. Other coatings, scrims or films, selected in the group of polyester, nylon, polyethylene may be used as long as they are able to resist to the temperatures found in the production process of the laminate or during production of the footwear product.

An additional layer of textile (18) may also be bonded to the upper layer of foam (4). In the embodiment illustrated in FIG. 2, the fibers (12) of the bottom layer (10) which are threaded through the upper layer (4) are used for combining this additional layer of textile (18) on the surface of the upper layer (4). In another preferred embodiment (not illustrated), this additional layer may also be laminated to the surface of the top layer. This additional layer (18) may comprise another nonwoven mat, a felt, a knit, a brushed cloth, synthetic fur or any other kind of textile allowing to improve the aesthetic aspect or comfort of the product.

Figure 6:
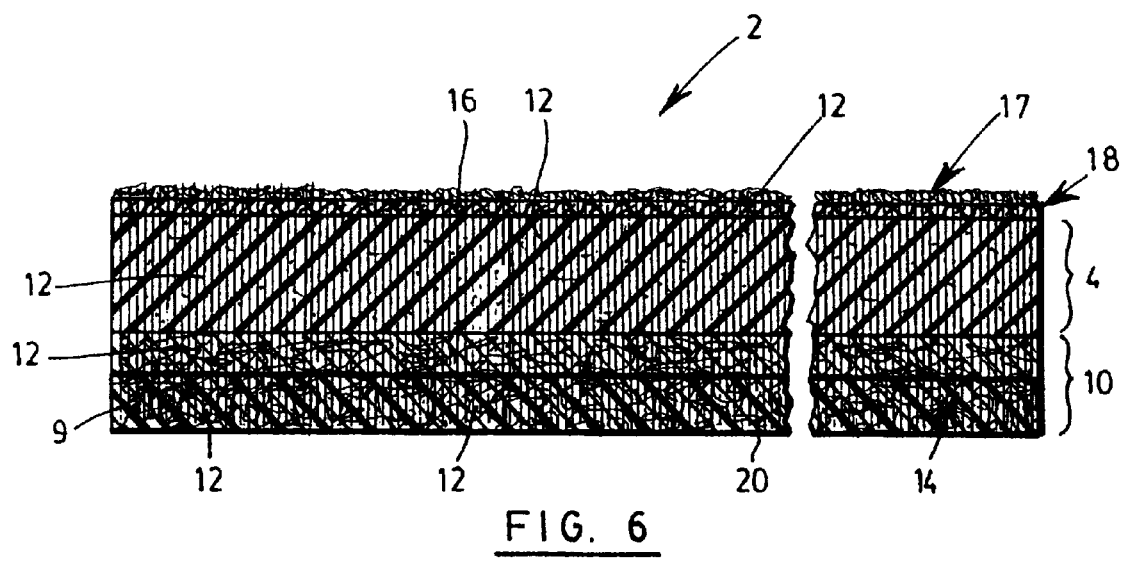
FIG. 6 is the same view as FIG. 5 showing the product after the impregnation of the fibrous layer with a resin.

As can be appreciated, the version of the invention illustrated in FIGS. 1, 2 and 6 takes advantage of the resilient properties of synthetic foams, the stiffness and the thermoformability of the fibrous mat, as well as the comfort provided by the fibers needled through the foam.

These properties are obtained by having a stiff bottom layer (10), an upper layer of a resilient synthetic foam (4) and an upper surface having a comfortable touch.

Preferably, the fibrous mat (10) comprises a plurality of fibers (12) selected in the group consisting of synthetic fibers such as polyester, polypropylene, nylon, etc., or artificial fibers such as rayon, viscose, etc., natural fibers such as wool, jute, etc., and mixtures thereof. The fibrous mat (10) may also comprise fibers with specific functions. For example, if the fibers transferred by the needling process are electrically conductive, the product will dissipate static electricity therefrom. Advantageously, the bottom layer (10) may comprise a small amount of electrically conductive fibers, preferably 1% to 20% in weight. These fibers have a resistivity lower than $10^{-3} \Omega cm$ and may be made of stainless steel, copper or synthetic fibers coated with a layer of nickel, silver or any other conductive metal. Carbon fibers, epitropic, or carbon coated fibers or polymeric conductive fibers can be used. For example, the fibrous mat (10) may comprise 3 to 6% of a nickel coated acrylic fibre produced for STATEX in Germany under the trademark EX-STAT.

The bottom layer (10) may also comprise fibers containing agents preventing fungus or bacteria growth. These fibers will prevent any bacteria growth under the foot and are preferably selected from the group consisting of polyester, polypropylene, acetate acrylic and the like. For example, an acetate fibre of 2 dtex manufactured by the company HOECHST under the name MICROSAFE may be suitable.

Preferably also, these fibers (12) are heat resistant.

The exact composition of the fibrous mat (10) depends on the process used for stiffening the structure and the expected use of the multilayer product.

Preferably, the fibers (12) of the fibrous mat (10) have a size comprised between 0.7 and 25 dtex, more preferably between 1.5 and 10 dtex. Their length is preferably comprised between 25 and 150 mm, and more preferably between 38 and 100 mm. The bottom layer (10) is made by a conventional process of carding and then needling the mixture of fibers chosen. Preferably, this bottom layer (10) has a surface density comprised between 70 and 1000 g/m², more preferably between 200 and 800 g/m².

The resilient foam material of the upper layer (4) may be an opened or closed-cell synthetic foam. It preferably consists of a polymer selected from the group consisting of polyurethane, polyester, polyether, cross-linked polyethylene, polyvinylic chloride, and the like. Such foams are available commercially. For example, an opened-cell polyurethane foam such as the one produced by RODGERS Co. under the trademark PORON may be used.

In a first preferred embodiment, the stiff portion (14) of the bottom layer (10) is obtained by impregnating an outer surface (20) of the fibrous mat (10) with a member selected from the group consisting of a latex, a solution of thermoplastic resin and a solution of thermosetting resin. This latex or solution is then dried and cross-linked. This operation gives the stiffness required for an inner sole.

Preferably, the fibrous mat (10) is stiffened while keeping a good resiliency for absorbing shocks. The resin is selected in the group consisting of acrylic, methylmethacrilate, ethylvinylacetate, polyvinyl alcohol, styrene butadiene resin and styrene butadiene comprising melamine formol.

The amount of resin required varies between 100 and 350 g/m² in the dry state, preferably 150 and 250 g/m².

In a second preferred embodiment, the fibrous mat (10) may be stiffened by mixing constructive fibers with binder fibers. More particularly, in this case, the fibrous mat (10) comprises a plurality of constructive fibers having a given melting point and a plurality of binding fibers having a melting point smaller than the melting point of the constructive fibers. The stiff portion (14) of the fibrous mat (10) is then obtained by subjecting the outer surface (20) of the fibrous mat (10) to a temperature greater than the melting point of the binding fibers and smaller than the melting point of the constructive fibers. By heating the fibrous mat (10) to a temperature just enough to exceed the melting point of the binding fibers, the stiffness required is obtained. Preferably, it is only the fibrous mat (10) which is subjected to heat, while the upper part of the structure remains at room temperature. In this way, the suppleness of the foam is kept.

The proportions of the binding fibers in the fibrous mat (10) preferably vary from 10% to 80% by weight, more preferably from 25% to 60%. These binding fibers are preferably selected from the group consisting of polyesters or copolyesters having a low softening temperature, high or low density polyethylene, polypropylene or dual fibers of the type sheath core or side by side. For the case of sheath core fibers, the heart has a high melting point while the core comprises a polymer with a low melting point. During the heating, this core will keep the linkage between the fibers.

Figure 3:
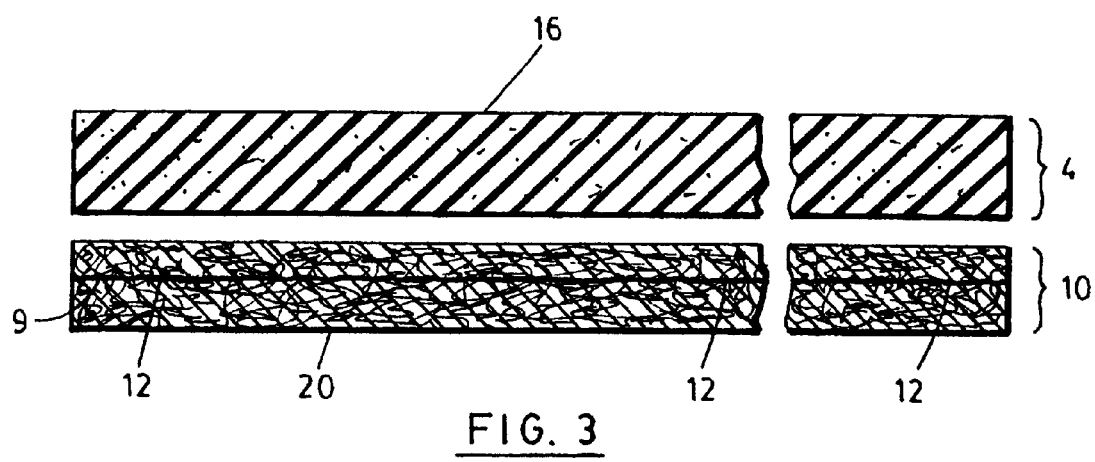
FIG. 3 is a side elevational cross-sectional view of a laminated product according to the present invention shown before the needling step of the method.
Figure 4:
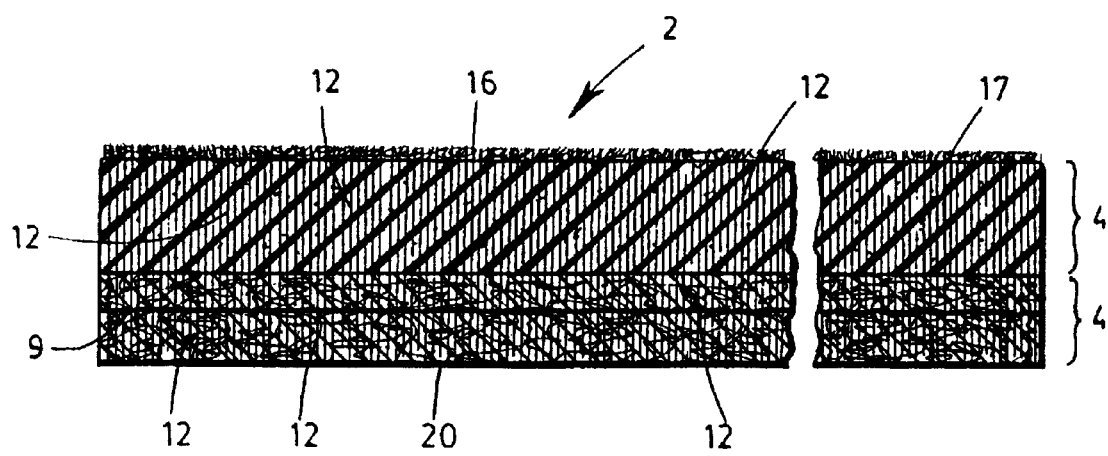
FIG. 4 is the same view as FIG. 3 showing the product after the needling step.
Figure 5:
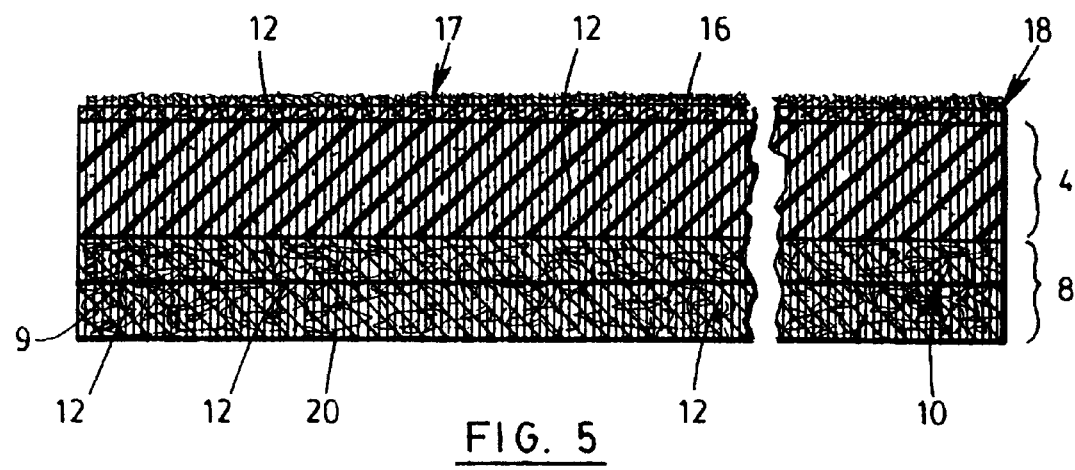
FIG. 5 is the same view as FIG. 4 showing a layer of textile needled to the upper layer of foam.

Referring to FIGS. 3 to 6, consecutive steps of a preferred version of a method of manufacturing a laminated product suitable for use in footwear manufacturing are illustrated. The method comprises the steps of a), needling a layer made of a fibrous mat (10) comprising a multiplicity of fibers (12) to a layer made of a resilient foam material (4) such that a fraction of said fibers (12) penetrates the foam material (4). FIG. 3 shows the fibrous mat (10) and the layer of foam (4) before the needling step and FIG. 4 shows the same layers after the needling step. Preferably, as illustrated in FIG. 5, in step a), the fraction of the fibers (12) which are threaded through the foam material (4) may also be used for combining an additional layer of textile (18) as described hereinbefore. This additional layer (18) may also be laminated to the product by using conventional laminating methods. The method further comprises the step of b), stiffening a portion of the fibrous mat for providing stiffness to the insole, as shown in FIG. 6, and then step c), if the product is going to be used as an insole, of forming an insole having an outline shaped for incorporation in the footwear.

The fibrous mat (10) and foam material (4) used are preferably as the fibrous mat and foam material described hereinbefore.

Preferably, after stiffening the bottom portion of the laminate by methods described in the invention, an additional step of calendering may help make denser a fibrous mat (10) reinforced with a reinforcement fabric (9) in order to achieve a Frazier air permeability smaller than 5 cubic feet per minute. Such a laminate is well suited for construction of footwear by injection molding of thermoplastic, rubber, polyurethane, or polyvinylchloride soles directly against the insole described in the invention.

As can be appreciated, the method consists in transferring a portion of the fibers (12) contained in the bottom layer (10) through the upper layer (4) by means of needles provided with barbs. The amount of transferred fibers (12) may be adjusted by controlling the number of penetrations per square centimeter and controlling the depth of the needle into the foam (4).

Preferably, the threaded fibers emerge from the outer surface (16) of the upper layer (4) and therefore these fibers are visible on the surface of the upper layer (4) and are forming a pilosity (17) thereon.

This pilosity (17) on the surface of the upper layer (4) provides a comfortable finish to the product. It also allows easy dissipation of the perspiration and moisture therefrom. Furthermore, the fibers (12) which are threaded through the upper layer (4) improve the transfer of perspiration and moisture from the foot towards the bottom layer (10) where it could be dissipated. If the fibers (12) brought to the outer surface (16) of the upper layer (4) are electrically conductive fibers or the fibers preventing bacteria growth, these fibers on the surface of the top layer (4) allow either to dissipate static electricity, provide a link between the sole and the foot, or prevent bad odours due to bacteria growth.

Preferably, the stiffening of step b) comprises the steps of:
partially impregnating the fibrous mat (10) with a member selected from the group consisting of a latex, a solution of thermoplastic resin and a solution of thermosetting resin;
heating the fibrous mat (10) to a temperature comprised between 100° C. and 200° C., preferably between 130 to 180° C. and for a time sufficient to allow the evaporation of the dispersion solvent and the reticulation of the resin; and
cooling the fibrous mat (10).

FIG. 6 shows the laminated product (2) after it has been made stiff by partially coating the fibrous mat (10) with a latex or a solution comprising a synthetic resin. The dispersion beforehand transformed into foam is pushed into the non woven mat (10) by means of a scrape or any other process allowing an impregnation at a predetermined depth in the non woven fibrous mat (10). The fibrous mat (10) is then subjected to a temperature comprised between 100 to 200° C., preferably between 130 to 180° C. for a time sufficient to allow the evaporation of the dispersion solvent and the reticulation of the resin. After cooling, the stiffness obtained is controlled by measuring the bending resistance of the structure. Preferably for the embodiment illustrated in FIG. 6, the upper layer (4) comprises a foam made of polyurethane which is not deteriorated through this process.

Preferably, the fibrous mat (10) is impregnated with a resin in an amount comprised between 100 and 350 g/m$^2$ of fibrous mat, and more preferably between 150 and 250 g/m$^2$.

Alternatively, the stiffening of step b) may be performed with a process which does not use binders in the form of dispersion. In this case, and as described hereinbefore, the fibrous mat (10) comprises a plurality of constructive fibers having a given melting point and a plurality of binding fibers having a melting point smaller than the melting point of the constructive fibers, and wherein the stiffening of step b) comprises the steps of:
subjecting for a given time an outer surface (20) of the fibrous mat (10) to a temperature greater than the melting point of the binding fibers and smaller than the melting point of the constructive fibers; and
cooling the fibrous mat (10).

As for the other preferred embodiments, the fibrous mat (10) may also comprise conductive fibers or fibers preventing bacteria growth. This embodiment is stiffened by transferring heat to the fibrous mat (10) preferably by means of a system consisting of two continuous bands. One band is heated to a temperature sufficient for softening the binder fibers. The other band is maintained at room temperature and is kept at a distance which is equal to or slightly inferior to the width of the structure. The structure has to be maintained at the softening temperature for a time long enough for allowing heat to penetrate into the width of the fibrous mat (10) without heating or softening the upper layer (4). Other heating techniques may be used for heating the fibrous mat (10). For example, radiation, convection or induction techniques may be used.

A laminated product (2) according to the present invention may afterwards be thermoformed into a desired shape, as illustrated in FIG. 6.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

We claim:

1. A laminated product for use in footwear comprising:
an upper layer of a resilient foam material having an upper surface to face a foot; and
a bottom layer of a fibrous mat having one surface supporting the lower surface of said upper layer, said fibrous mat comprising:
a multiplicity of fibers, a fraction of which penetrates the foam material of the upper layer for bonding the bottom layer to the upper layer; and
a stiffening portion on the other surface of said fibrous mat to impart rigidity to the product.

2. A laminated product as claimed in claim 1, wherein said fibrous mat includes a non-woven mat comprising a plurality of fibers selected from the group consisting of synthetic fibers, artificial fibers, natural fibers and mixtures thereof.

3. A laminated insole for a footwear comprising:
an upper layer of a resilient foam material having an upper surface to face a foot and having an outline shaped for incorporation in the footwear; and
a bottom layer having one surface for supporting the lower surface of said upper layer of a fibrous mat having a shape conforming with the outline of the upper layer, said fibrous mat comprising:
a multiplicity of fibers having a fraction of which penetrates the foam material of said upper layer for bonding said bottom layer to said upper layer; and
a stiffening portion extending on the other surface of said fibrous mat to impart rigidity to the product.

4. A laminated insole as claimed in claim 3, wherein:
said fibers of the fraction penetrating the foam material emerges from said upper layer upper surface and provides a pilosity thereon.

5. A laminated insole as claimed in claim 4, wherein said fibrous mat comprises a non-woven mat of a plurality of fibers selected from the group consisting of synthetic fibers, artificial fibers, natural fibers and mixtures thereof.

6. A laminated insole as claimed in claim 5, wherein the synthetic fibers are selected from the group consisting of polyester, polypropylene, nylon and mixtures thereof.

7. A laminated insole as claimed in claim 5, further comprising a reinforcement laminate embedded in said fibrous mat.

8. A laminated insole as claimed in claim 7, wherein said reinforcement laminate comprises a scrim fabric.

9. A laminated insole as claimed in claim 8, wherein the scrim fabric is selected in the group consisting of polypropylene, polyester, nylon and polyethylene scrim fabrics.

10. A laminated insole as claimed in claim 8, wherein the scrim fabric is coated with a 1 to 3 mils coating selected from the group consisting of polypropylene, polyester, nylon and polyethylene coating.

11. A laminated insole as claimed in claim 5, wherein the foam material comprises an opened or closed-cell synthetic foam.

12. A laminated insole as claimed in claim 11, wherein the synthetic foam comprises a polymer selected from the group consisting of polyurethane, polyester, polyether, cross-linked polyethylene, polyvinylic chloride and mixtures thereof.

13. A laminated insole as claimed in claim 5, wherein said fibers have a size in the range between 0.7 and 25 dtex.

14. A laminated insole as claimed in claim 13, wherein said fibrous mat has a surface density of between 70 and 1000 g/m$^2$.

15. A laminated insole as claimed in claim 5, wherein said fibers are heat resistant.

16. A laminated insole as claimed in claim 5, wherein said fibrous mat comprises fibers containing at least one agent for preventing fungus or bacteria growth.

17. A laminated insole as claimed in claim 5, further comprising:
an additional layer of textile bonded to said foam upper layer.

18. A laminated insole as claimed in claim 5, wherein said stiffened portion of said fibrous mat comprises the outer surface of said fibrous mat impregnated with a material that has hardened.

19. A laminated insole as claimed in claim 18, wherein said binding fibers are selected in the group consisting of polyester, copolyester, polyethylene, polypropylene and sheath core fibers.

20. A laminated insole as in claim 18 wherein said material that has hardened is selected from the group consisting of a latex, a solution of thermoplastic resin and a solution of thermosetting resin.

21. A laminated insole as claimed in claim 5, wherein:
said fibrous mat comprises a plurality of constructive fibers having a given melting point and a plurality of binding fibers having a melting point lower than the melting point of the constructive fibers; and
said other surface of said fibrous mat having melted binding fibers forming said stiffening portion.

22. A laminated insole as claimed in claim 21, wherein said fibrous mat comprises from 10% to 80% of said binding fibers by weight.

23. A laminated insole as claimed in claim 21, wherein fibers of said fibrous mat are electrically conductive.

24. A method of manufacturing a laminated product suitable for use in footwear comprising the steps of:
a) needling a layer of a fibrous mat comprising a multiplicity of fibers to a layer of a resilient foam material such that a fraction of said fibers penetrates said foam material to support said layer of resilient foam material on one surface of said layer of fibrous mat; and
b) stiffening a portion of said fibrous mat to the product, extending on the other surface of the fibrous mat to provide rigidity to the product.

25. A method as claimed in claim 24 wherein the stiffening step b), comprises the steps of:
impregnating the fibrous mat other surface with a material selected from the group consisting of a latex, a thermoplastic resin and a thermosetting resin;
heating the fibrous mat to a temperature between 100° C. and 200° C.; and
cooling the fibrous mat.

26. A method as claimed in claim 25, wherein the fibrous mat is impregnated with a resin in an amount of between 100 and 350 g/m$^2$ of the fibrous mat.

27. A method as claimed in claim 26, wherein the fibrous mat comprises a plurality of constructive fibers having a given melting point and a plurality of binding fibers having a melting point lower than the melting point of the constructive fibers, and wherein the stiffening step b) comprises the steps of:
subjecting for a given time said other surface of the fibrous mat to a temperature greater than the melting point of the binding fibers and smaller than the melting point of the constructive fibers; and
cooling the fibrous mat.

28. A method as claimed in claim 24, further comprising:
embedding a reinforcement laminate in the fibrous mat; and
calendaring the laminated insole to make the fibrous mat denser.

* * * * *